US007062340B2

(12) United States Patent
Melanson

(10) Patent No.: US 7,062,340 B2
(45) Date of Patent: Jun. 13, 2006

(54) AUDIO DATA PROCESSING SYSTEMS AND METHODS UTILIZING HIGH OVERSAMPLING RATES

(75) Inventor: John Laurence Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 264 days.

(21) Appl. No.: 10/397,767

(22) Filed: Mar. 26, 2003

(65) Prior Publication Data

US 2004/0193296 A1 Sep. 30, 2004

(51) Int. Cl.
*G06F 17/00* (2006.01)

(52) U.S. Cl. ......................... 700/94; 341/143; 341/144

(58) Field of Classification Search ................ 341/143, 341/61, 144, 145, 126, 76; 700/94
See application file for complete search history.

(56) References Cited

U.S. PATENT DOCUMENTS 5,872,531 A * 2/1999 Johnson et al. ............. 341/144
6,130,633 A * 10/2000 Lee et al. .................... 341/143
6,255,975 B1 * 7/2001 Swanson ..................... 341/143
6,323,795 B1 * 11/2001 Yang et al. ................. 341/143
6,489,909 B1 * 12/2002 Nakao et al. ............... 341/144

* cited by examiner

*Primary Examiner*—Brian T. Pendleton
(74) *Attorney, Agent, or Firm*—James J. Murphy; Thompson & Knight LLP

(57) ABSTRACT

A method of processing digital audio data includes receiving an input stream of audio data having a first quantization and a high oversampling rate. The input stream is requantized in a first processing block at the high oversampling rate to a second quantization. The requantized stream of audio data is processed in a second processing block at the high oversampling rate and the second quantization.

25 Claims, 7 Drawing Sheets

AUDIO DATA PROCESSING SYSTEMS AND METHODS UTILIZING HIGH OVERSAMPLING RATES

FIELD OF INVENTION

The present invention relates in general to digital audio systems and in particular, to audio data processing systems and methods utilizing high oversampling rates.

BACKGROUND OF INVENTION

The Super Audio Compact Disk (SACD) system records audio data on an optical disk as a single-bit digital data stream at a high oversampling rate. This high oversampling rate advantageously extends the signal bandwidth well beyond the range of human audibility and reduces the need for significant anti-aliasing filtering. Consequently, audible time-domain effects, which normally result when steep low-pass anti-aliasing filters are used in traditional digital audio systems, are typically no longer a significant problem in SACD systems.

The advantages provided by the high oversampling rate of the SACD bit stream are countered to a certain degree by the significant disadvantages of the one-bit data format. For example, to maintain a large dynamic range in the audio band using one-bit data, the quantization noise must be shifted out of the audio band with a noise transfer function having a relatively steep passband edge. Delta-sigma modulators are commonly utilized in SACD systems to generate such a noise transfer function, although conventional delta-sigma modulators are normally insufficient for some advanced audio applications.

Increasingly, SACD systems are being integrated into audio systems, such as those found in home theater systems, which utilize a set of main speakers without an extended bass response and a subwoofer which provides the remaining low frequency bass output. The task of digitally splitting and converting to analog signals the bass and higher frequency data in these systems is difficult since highly oversampled data is being processed. Ideally, the crossover filtering and mixing required to make the frequency split would be done at the full SACD oversampling rate to realize the advantages of highly oversampled data discussed above. Filtering from highly oversampled one-bit data, however, normally requires performing highly accurate multiplications on digital data words of significantly long length. Accurate multiplication of long digital words, in turn, becomes computationally intensive in either hardware or software.

Hence, some new techniques are required for processing highly oversampled audio data, such as SACD data, which support applications such as home theater audio and, at the same time, are relatively simple and inexpensive to implement.

SUMMARY OF INVENTION

The principles of the present invention provide a protocol for processing highly oversampled digital audio data, such as single-bit audio data in the SACD format. Generally, the input data are requantized to a higher number of bits and then processed in the requantized form while maintaining the high oversample rate of the input data. The high oversampling rate allows for minimization of any required anti-aliasing filtering while the requantized data advantageously allow the out-of-band quantization noise to be reduced with simpler filters.

According to one particular embodiment of the inventive principles, a method is disclosed for processing digital audio data, which includes receiving an input stream of audio data having a first quantization and a high oversampling rate. The input stream is requantized in a first processing block at the high oversampling rate to a second quantization. The requantized stream of audio data is processed in a second processing block at the high oversampling rate and the second quantization.

The principles of the present invention provide the advantages of both a high oversampling rate and multiple-bit quantization to be realized in the same system. In particular, these principles allow for both the anti-aliasing filters and the low-pass filters required for removing out-of-band noise to be simpler and less expensive. Furthermore, they may be implemented in either discrete hardware or on a DSP running software.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIG. 1–6 of the drawings, in which like numbers designate like parts.

Figure 1A:
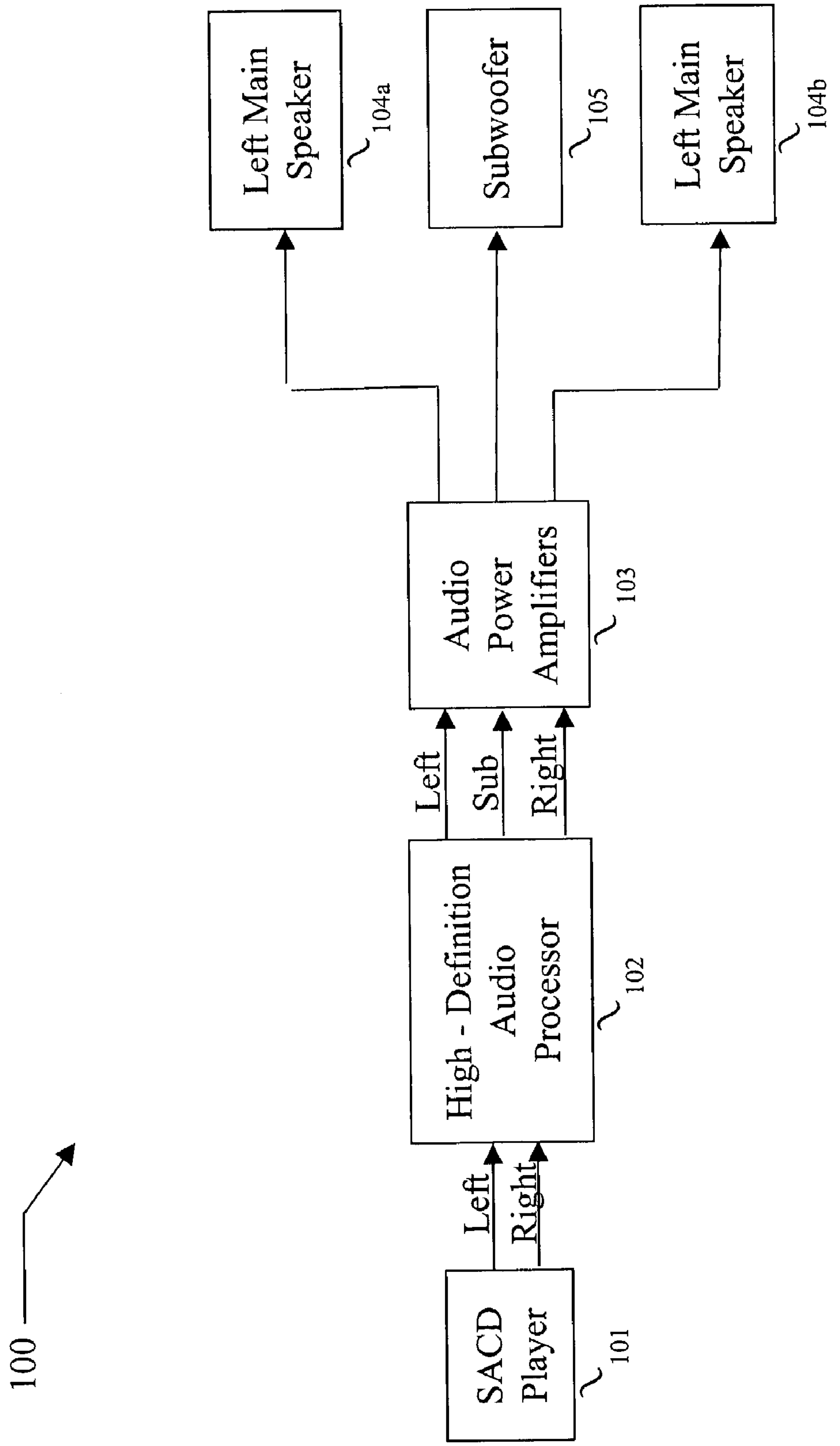
FIG. 1A is a high level block diagram of a representative audio system according to the inventive principles.

FIG. 1A is a high-level block diagram of an exemplary audio system 100 embodying the principles of the present invention. Audio system 100 includes a Super Audio Compact Disk (SACD) player 101 or similar data source providing SACD formatted audio data as a one-bit digital stream oversampled sixty-four times the base audio sampling frequency (i.e., 64 $f_s$). The stream of SACD formatted data output from SACD player 101 is processed by a High Definition Super Audio processor 102 in the Cirrus Logic High Definition Audio™ (HDA) format. The resulting left, right, and bass analog audio streams output from HDA processor 102 are amplified by audio power amplifiers 103, which in turn drive a pair of left and right main speakers 104*a* and 104*b* and a subwoofer 105. While HDA processor 102 in the illustrated embodiment of FIG. 1A processes SACD input data, the principles of the present invention are not limited thereto. Generally, these principles can be applied to other forms of digital audio data, such as pulse code modulated (PCM) audio data at a high or very high oversampling rate of eight times the base audio sampling rate (i.e., 8 $f_s$) or greater. As discussed further below, HDA processor 102 preferably operates on the input data streams at the same high oversampling rate as the output player 101 but with an intermediate multiple-bit quantization less than the traditional audio quantization of sixteen-bits, and preferrably between two and twelve bits.

Figure 1B:
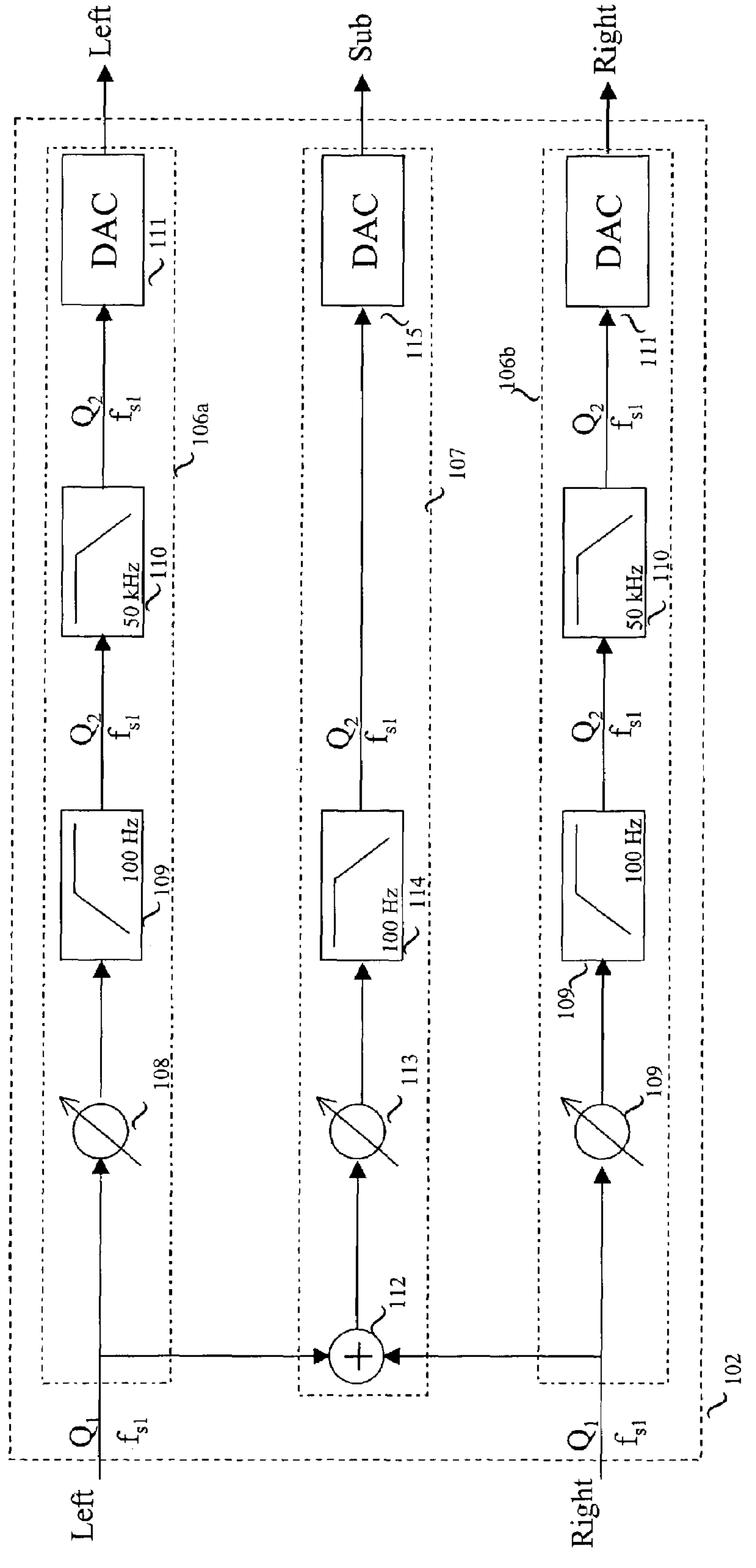
FIG. 1B is a more detailed block diagram of an exemplary embodiment of the High Definition Super Audio (HDA) processor shown in FIG. 1A.

FIG. 1B is a more detailed block diagram of one embodiment of HDA processor 102 of FIG. 1A. In the embodiment illustrated in FIG. 1B, HDA processor 102 includes left and right processing paths 106*a* and 106*b* for generating respective left and right main channel audio signals for driving corresponding left and right main speakers 104*a* and 104*b* and a bass processing path 107 for generating bass analog audio for driving subwoofer 105. In alternate embodiments, the number of audio channels may vary as required to implement audio systems utilizing surround sound and similar home theatre protocols. Generally, each of the left and right digital audio channels is input into HDA processor 102 with a quantization $Q_1$ and an oversampling frequency $f_{s1}$. Again, for the illustrated embodiment of audio system 100 operating on SACD format data, the input quantization $Q_1$ is one-bit and the oversampling frequency $f_{s1}$ is $64f_s$. HDA processor 102 may be implemented in discrete hardware, by a digital signal processor (DSP) and associated software, or a combination of a DSP and discrete hardware.

Each input stream is scaled by a multiplier 108 to provide independent volume control for the corresponding left or right main channel. Independent volume controls multipliers 108 for main speaker paths 106*a* and 106*b*, along with the corresponding volume control multipliers 113 within bass processing path 107 discussed below, allow for user controlled equalization of the audio output from speakers 104*a*–104*b* and 105.

After scaling for volume control, the left and right main channel audio streams are each passed through a respective high pass crossover filter 109 which filters out the bass components and outputs re-quantized audio data in the HDA format. In the illustrated embodiment, high pass filters 109 each have a corner frequency of approximately 100 Hz and output requantized data with a quantization $Q_2$ in the range of two to twelve bits at the same high oversampling rate $f_{s1}$ as the input data streams. Delta-sigma noise filters suitable for use as high pass crossover filters 109 are discussed further below in conjunction with FIG. 2.

The HDA data streams output from high pass crossover filters 109 are then filtered by low pass filters 110 to remove out-of-band noise. When the input stream is SACD formatted data, low pass filters 110 have a Butterworth response and a corner frequency of approximately 50 kHz. Exemplary delta-sigma modulators that provide such a low pass signal transfer function (STF) are discussed below in conjunction with FIG. 7.

Each left and right channel processing path 106*a* and 106*b* includes a digital to analog converter (DAC) 111, which operates on the HDA data to produce left and right channel analog audio. DACs 111 are preferrably switch capacitor or current steering DACs operable at the high input sampling frequency $f_{s1}$ and having a number of conversion elements corresponding to the intermediate quantization $Q_2$, in accordance with the HDA format.

Bass-processing path 107 includes a summer 112 which sums the left and right data streams received at the inputs to HDA processor 102 to generate a composite audio stream. A scaler (multiplier) 113 multiplies the composite stream generated by summer 111 by a user-defined factor to implement bass volume control.

A lowpass bass crossover filter 114 extracts a bass data stream from the output of scaler 113. In this example, low pass crossover filter 114 has a corner frequency of approximately 100 Hz, although the corner frequency may vary depending on the system requirements. Lowpass crossover filter 114 also requantizes the extracted bass stream to the selected HDA quantization $Q_2$, which again is preferably between two and twelve bits. The data stream out of the low pass crossover filter 114 is also at the high sampling rate $f_{s1}$ of the left and right input streams. A DAC 115 converts the high sampling rate bass data stream generated in bass processing path 107 into analog form for amplification by power amplifiers 103 and to ultimately drive subwoofer 105 (see FIG. 1A). An exemplary delta-sigma modulator topology for lowpass crossover filter 114 is discussed below in conjunction with FIG. 5.

Telescopic filters embodying the present inventive principles advantageously allow for crossover filtering to be performed efficiently at high oversampling rates, such as those used in the HDA format. In the illustrated embodiment, highpass crossover filters 109 of left and right channel processing paths 106*a* and 106*b* and lowpass crossover filter 114 of bass processing path 107 of FIG. 1B are such telescopic filters, characterized as follows.

All infinite impulse response (IIR) digital filters can be analyzed as transpose form filters. Transpose form filters are very similar to the delta-sigma modulators typically used in DACs. In particular, the truncation operations performed in IIR filters are mathematically equivalent to the quantization operations of a delta-sigma modulator. Specifically, the truncation of the results of the multiplication operations performed in an IIR filter add white noise and gain to the output similar to the quantizer in a delta-sigma modulator. Therefore, an IIR filter can be designed in transpose form and the truncation of multiplication operations consolidated in a delta-sigma modulator output quantizer.

In the case of subwoofer crossover filter 114, a lowpass filter is designed in transpose form, the typical IIR delay elements are replaced with delaying integrators and the normal truncation operations are replaced with a simple delta-sigma modulator, such as a second order five-bit delta-sigma modulator. This process is illustrated in FIGS. 2A–2B.

Figure 2A:
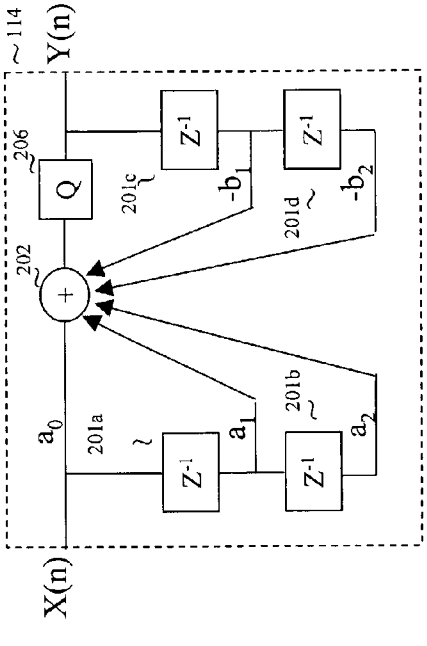
FIG. 2A is a block diagram of a generalized direct form IIR filter suitable for utilization in the bass crossover filter of FIG. 1B.

FIG. 2A is a block diagram of a generalized direct form IIR filter 114. In this example, filter 114 is a second order IIR filter including a set of delays 201*a*–201*d* and a summer 202 summing the output of each delay stage 201*a*–201*d* after multiplication by a corresponding coefficient $a_0$, $a_1$, $a_2$, $b_1$ or $b_2$. Quantizer 206 performs the truncation operations to reduce the number of bits resulting from the multiplication operations.

Figure 2B:
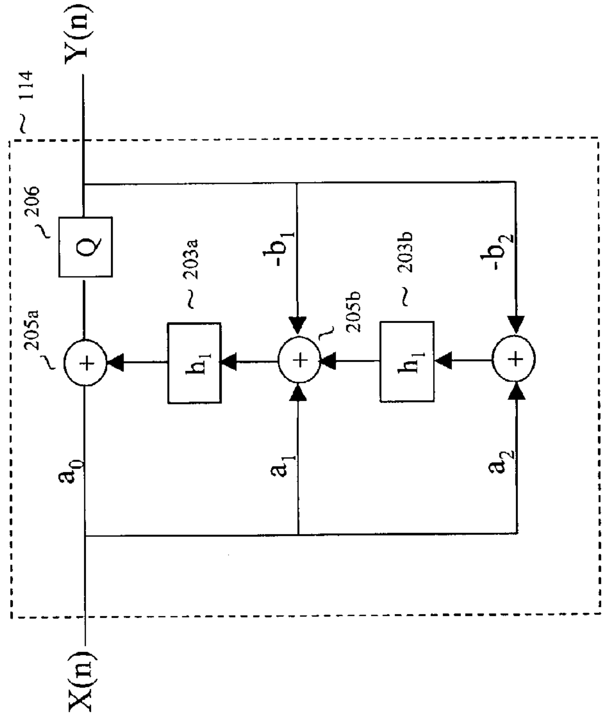
FIG. 2B is a block diagram of the transpose form of the IIR filter shown in FIG. 2A.

Filter 114 is shown in the equivalent transpose form in FIG. 2B, in which stages $h_1=Z^{-1}$, and adder 202 is split into two adders 205*a* and 205*b*. Conversion of a direct form IIR filter into transpose form is described in digital signal processing texts such as Proakis and Manolakis, *Digital Signal Processing Principles, Algorithms and Applications*, Prentice-Hall, (1996).

Figure 2C:
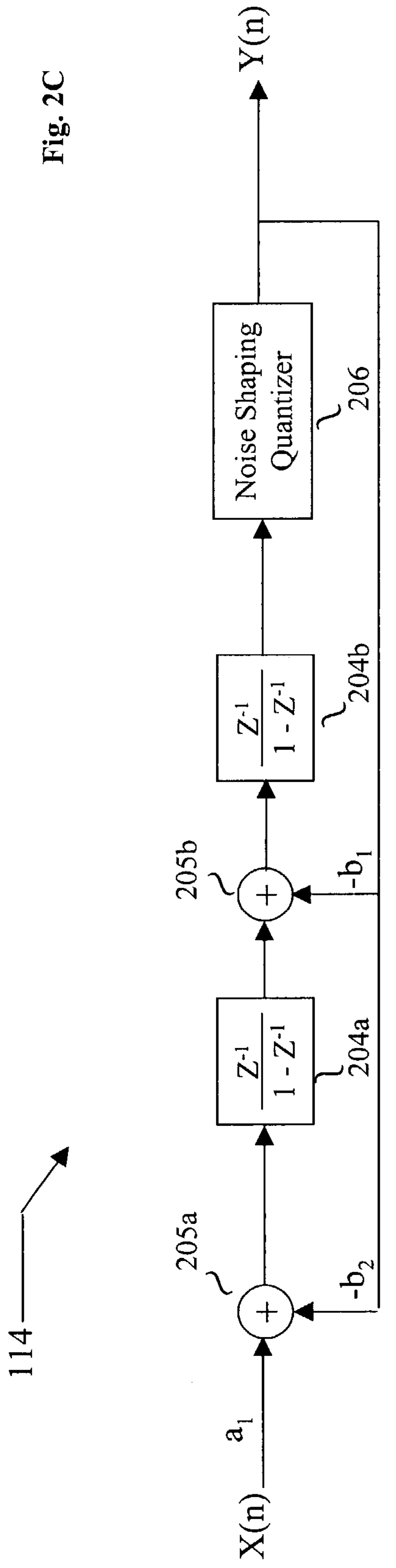
FIG. 2C is a lowpass feedback filter with a noise shaping quantizer output stage, as derived from the transpose IIR filter of FIG. 2B, and suitable for utilization in the lowpass cross-over filter of FIG. 1B.

As shown in FIG. 2C, if stages 203*a* and 203*b* of the transpose form filter of FIG. 2B, are replaced with delaying integrators 204*a* and 204*b* with a function $Z^{-1}/(1-Z^{-1})$, the coefficients $a_1$ and $a_0$ are set to zero, and the truncation of multiplication results is performed in noise shaping quantizer. Filter 114 then takes on the topology shown in FIG. 2C, which is essentially the topology of a feedback delta-sigma modulator. Specifically, filter 114 now includes a pair of delaying integrator stages 204*a* and 204*b* and associated input summers 205*a* and 205*b* which implement the feed forward coefficient $a_2$ and the feedback coefficients $-b_2$ and $-b_1$. The truncation of the results of the multiplications by the digital stream by coefficients $a_2$, $-b_2$, and $-b_1$ is now performed in a noise shaping quantizer 206, which preferably has a flat or constant STF and a low order topology. One exemplary topology for noise shaping quantizer 206 is discussed below in conjunction with FIG. 3. Because noise shaping quantizer 206 noise shapes out-of-band noise to higher frequencies, the number of bits which must be fedback to summers 205*a* and 205*b* can be advantageously and relatively small (e.g., around five bits for audio systems, such as system 100 of FIG. 1A). In turn, the multiplications by feedback coefficients $-b_2$ and $-b_1$ are relatively easy to implement in either hardware or software.

Figure 3:
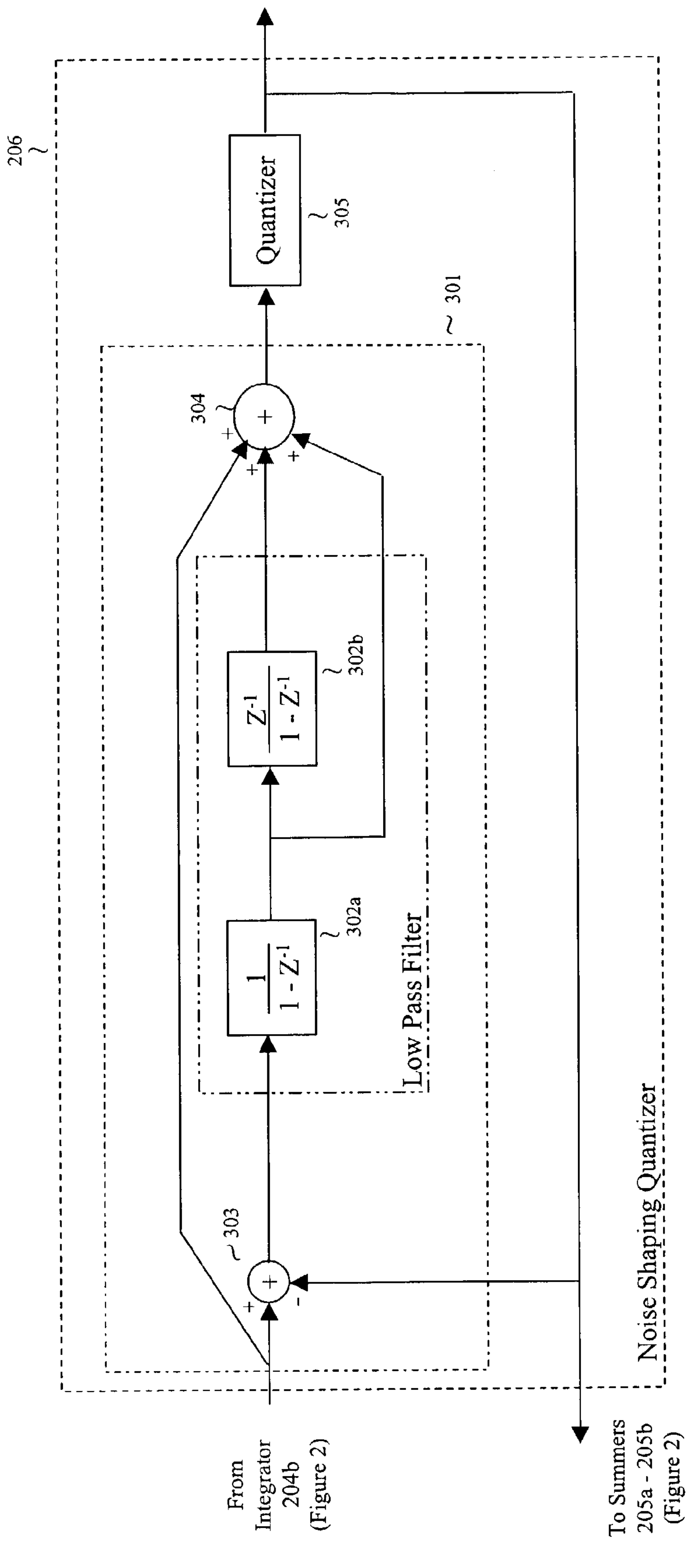
FIG. 3 illustrates a feedforward noise-shaping quantizer suitable for utilization in the filter shown in FIG. 2C.

FIG. 3 is a block diagram of an exemplary feedforward embodiment of noise shaping quantizer 206. Noise shaping quantizer 206 includes a quantizer loop filter 301 with a constant STF of approximately one (1) (i.e., a generally flat response across a wide frequency band) and an all zero NTF selected to noise shape the quantized output. In the embodiment of noise shaping quantizer 206 shown in FIG. 3, the NTF is $(1+Z^{-1})^2$ which generates two co-located NTF zeros at the Nyquist frequency. In alternate embodiments, the NTF and the location of the zeros may vary depending on the desired noise shaping.

Exemplary quantizer loop filter 301 includes a pair of integrator stages 302*a*–302*b*, an input summer 303 and an output summer 304. The direct input to quantizer 206, the output from first integrator stage 302*a*, and the output from second integrator stage 302*b* are summed into the input of quantizer 305 by summer 304. Quantizer 305, which can also be a second noise shaping quantizer in telescoped quantizer embodiments, then provides noise shaped feedback to noise shaping quantizer input summer 303 and summers 205*a* and 205*b* of the embodiment of filter 114 shown in FIG. 2C. As a result of the noise shaping in quantizer loop filter 301, the number of output bits from truncator 305 is relatively small, around five (5) bits for audio applications.

Figure 4:
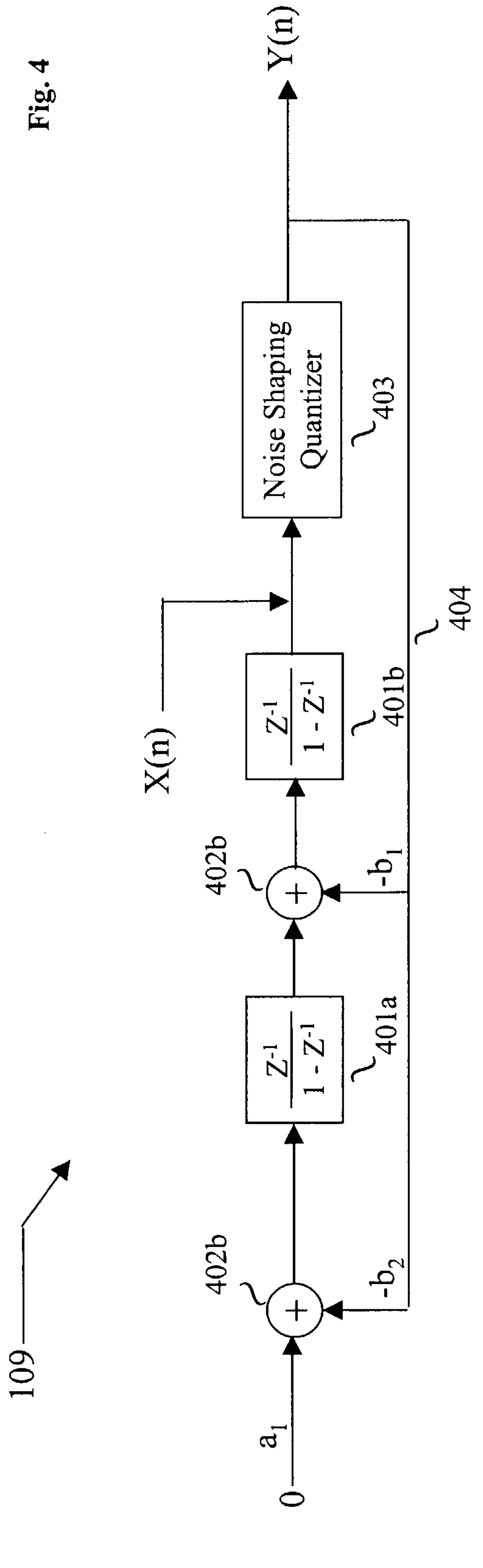
FIG. 4 is a block diagram of a highpass filter according to the inventive principles and suitable for use in the highpass cross-over filter of FIG. 1B.

The illustrated embodiment of Filter 114, as ultimately depicted in FIG. 2C, works very well as a subwoofer crossover filter. However, application of the same principles to higher frequency filters, such as the highpass crossover filters 109 of FIG. 1B requires an additional modification. FIG. 4 illustrates one embodiment of highpass crossover filters 109 according to the inventive principles. The same design technique discussed immediately above is utilized to design a low pass filter. In each filter 109, the primary input is then set to a constant such as zero. The input signal X(n) then is injected between the primary loop filter composed of integrators 401*a* and 401*b*, summers 402*a* and 402*b*, and noise shaping quantizer 403. The input signal X(n) then is shaped like noise (i.e., high passed) by the outer delta-sigma loop 404 between the output of noise shaping quantizer 403 and the feedback inputs to summers 402*a* and 402*b*.

Figure 5:
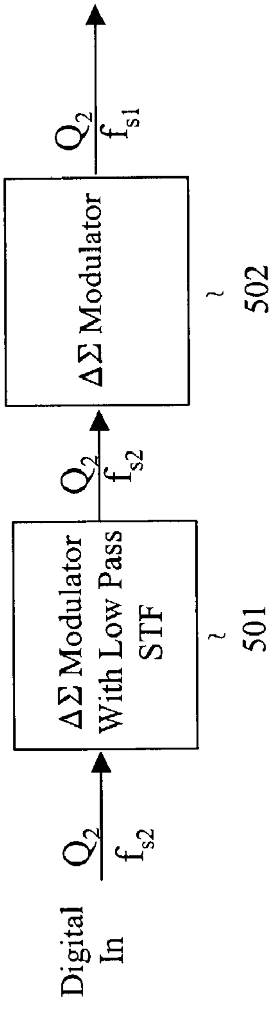
FIG. 5 is a block diagram of a delta-sigma modulator-filter embodiment of the lowpass output filters shown in FIG. 1B.

FIG. 5 is a block diagram of a delta-sigma modulator (filter) embodiment of lowpass filter 110 of system 100 as shown in FIG. 1A and embodying the principles of the present invention. In particular, delta-sigma filter 110 includes a first delta-sigma modulator 501, which generally defines the overall filter NTF baseband noise attenuation and STF signal gain. In the present example, first delta-sigma modulator 501 has a low-pass STF defined by a complex set of poles and shifts noise power in the NTF to higher out-of-band frequencies. A second delta-sigma modulator 502 implements at least one real pole and attenuates the noise shifted to the out-of-band frequencies by first delta-sigma modulator 501. A zero-order hold stage (not shown) may be provided to increase the sample rate out of first delta-sigma modulator 501 and further shift the out-of-band quantization noise to higher frequencies.

In the preferred embodiment, the quantization resolution of first delta-sigma modulator 501 (i.e. the number of output bits or levels) is greater than the quantization resolution of second delta-sigma modulator 502. Consequently, delta-sigma modulator 501 controls the level of quantization noise in the system while the quantizer of delta-sigma modulator 502 is designed to provide an optimum interface into the following DAC 111 (see FIG. 1B). For example, if the quantizer of second delta-sigma modulator 502 outputs a data in HDA format, the size and complexity of DACs 111 can be reduced.

Figure 6A:
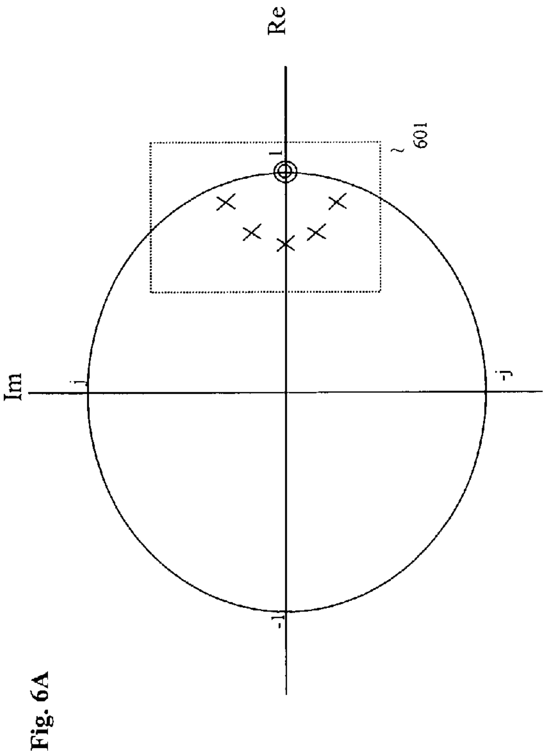
FIGS. 6A and 6B are respective pole-zero plots in the z-plane of an exemplary NTF and an exemplary STF for the first delta-sigma modulator in the filter of FIG. 5.
Figure 6B:
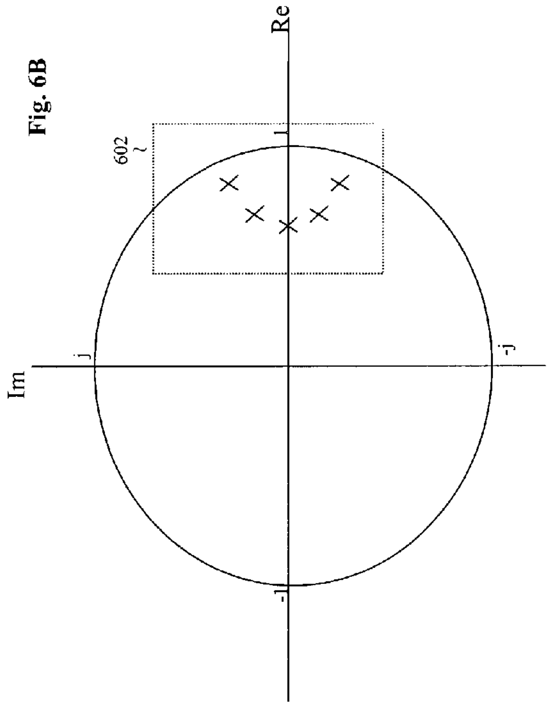

FIGS. 6A and 6B are pole-zero plots on the z-plane respectively of the NTF and STF of exemplary first delta-sigma modulator 501 of FIG. 5. In the illustrated embodiment, first delta-sigma modulator 501 is a fifth order modulator which generates five Butterworth poles and five co-located zeros at the zero frequency point (j=0) in the data converter NTF as shown generally at 601 in FIG. 6A. In this example, the NTF zeros are not split which advantageously reduces the amount of hardware required to construct first delta-sigma modulator 501. With respects to the STF shown in FIG. 6B, first delta-sigma modulator 501 generates a set of poles generally as shown at area 602. The number of complex NTF and STF poles and zeros at areas 601 and 602 and their location in the z-plane will vary from embodiment to embodiment depending on such factors as the desired pass band attenuation, steepness of the pass band edge, and the number of loop filter stages. In the embodiment of FIGS. 6A and 6B, the STF poles have been selected to produce a Butterworth response with a corner frequency of approximately 50 kHz at an oversampling rate of $64f_s$.

Second delta-sigma modulator 502 of FIG. 5 preferably inputs data at quantization resolution $Q_2$ and outputs data at a quantization resolution $Q_3$, in which the quantization resolution $Q_2$ is greater than the quantization at $Q_3$. For example, in the illustrated embodiment where 8-bit data is input into second delta-sigma modulator 502, the resulting recoded output may be four bits.

Figure 7A:
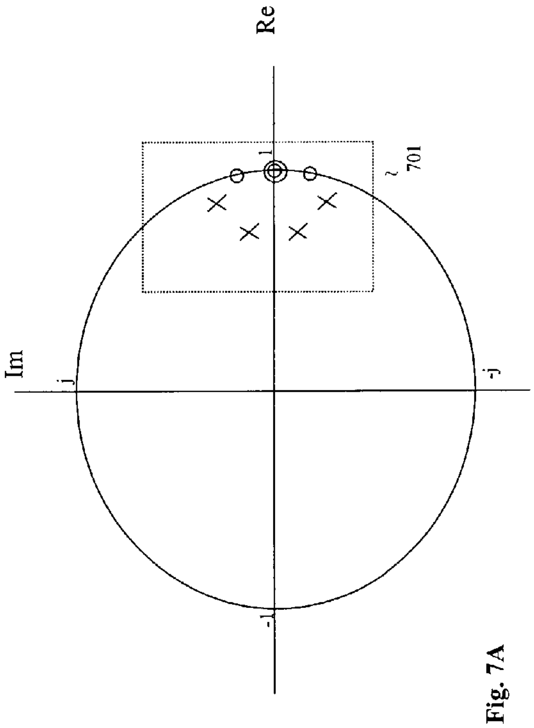
FIGS. 7A and 7B are respective pole-zero plots in the z-plane of an exemplary NTF and an exemplary STF for the second delta-sigma modulator in the filter shown in FIG. 5.
Figure 7B:
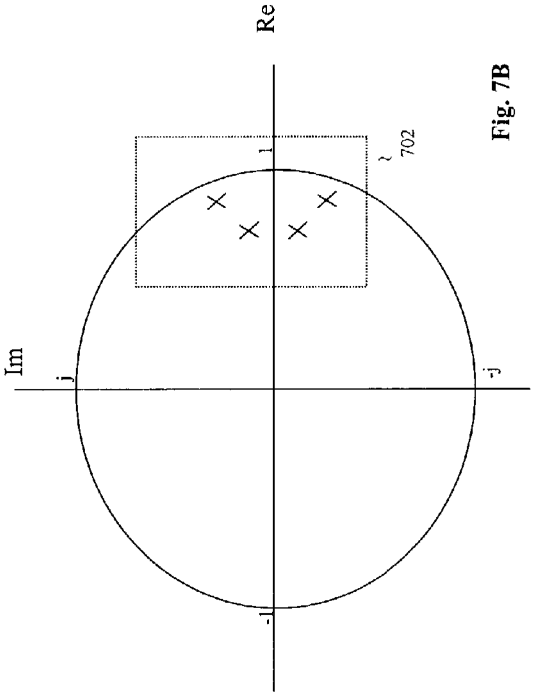

FIGS. 7A and 7B are respectively pole-zero plots in the z-plane of an exemplary NTF and an exemplary STF for second delta-sigma modulator 502 of FIG. 5. In the exemplary z-plane plot of FIG. 7A, the NTF includes four complex poles, two complex zeros and two co-located real zeros, shown generally at area 701. The STF shown in FIG. 7B, generally at area 702, includes four complex poles. In the illustrated embodiment, the STF is generally flat, or has a low pass response, and the NTF has a zero (0) gain crossover point of approximately 200 kHz at an oversampling rate of $128f_s$. With respect to second delta-sigma modulator 602, the number and location of the poles and zeros at areas 701 and 702 may vary, depending on the desired filtering function and constraints on the size and complexity of the hardware.

The topologies used for first and second delta-sigma modulators 501 and 502 of FIG. 5 are preferably simply and/or of a low order. The following DACs 111 of FIG. 1 can be substantially smaller and less complex, depending on the quantization performed by second delta-sigma modulator 502.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A method of processing digital audio data comprising:
receiving an input stream of audio data having a first quantization and a high oversampling rate;
requantizing the input stream of audio data in a first processing block at the high oversampling rate to a second quantization, the second quantization being of a greater number of bits than the first quantization; and
processing the requantized stream of audio data in a second processing block at the high oversampling rate and the second quantization.

2. The method of claim 1, wherein the first quantization is a single-bit quantization.

3. The method of claim 1, wherein the second quantization is a multiple-bit quantization in a range of two to twelve bits.

4. The method of claim 1, wherein the high oversampling rate is at least eight times an audio sampling rate.

5. The method of claim 1, wherein the high oversampling rate is at least sixty-four times an audio sampling rate.

6. The method of claim 1, wherein the high oversampling rate is at least one hundred and twenty-eight times an audio sampling rate.

7. The method of claim 1, wherein requantizing comprises requantizing the input stream in a delta-sigma highpass crossover filter.

8. The method of claim 1, wherein requantizing comprises requantizing the input stream in a delta-sigma lowpass crossover filter.

9. The method of claim 1 wherein processing the requantized stream of audio data comprises lowpass filtering to remove out-of-band noise in the input stream.

10. The method of claim 1, further comprising scaling the input stream to implement volume control.

11. The method of claim 1, wherein processing the requantized stream comprises converting requantized stream into an analog form at the high oversampling rate.

12. An audio system comprising:
a processing path receiving an input audio data stream having a first quantization and a selected oversampling rate, the processing path comprising:
a filter for filtering the input data stream at the selected oversampling rate and outputting a requantized data stream having a second quantization at the selected oversampling rate, the second quantization being of a greater number of bits than the first quantization; and
a processing block for operating on the requantized data stream at the selected oversampling rate.

13. The audio system of claim 12, wherein the first quantization is of a first number of bits and the second quantization is of a second number of bits, the first number of bits being less than the second number of bits.

14. The audio system of claim 12, wherein the selected oversampling rate is at least eight times an audio sampling rate.

15. The audio system of claim 13, wherein the first number of bits is one bit and the second number of bits is in the range of two to twelve bits.

16. The audio system of claim 12, wherein the filter comprises a lowpass filter.

17. The audio system of claim 12, wherein the filter comprises a highpass filter.

18. The audio system of claim 12, wherein the processing block comprises a lowpass filter.

19. The audio system of claim 12, wherein the processing block comprises a digital to analog converter.

20. The audio system of claim 12, wherein a selected one of the filter and the processing block is implemented in a digital signal processor.

21. An audio system, comprising:
a player outputting a stream of single-bit audio data at a high oversampling rate;
a set of speakers including a main speaker and a subwoofer; and
an audio processor for converting the single bit audio stream into analog form for driving the set of speakers comprising:
a first processing path for driving the main speaker including a
highpass crossover filter outputting a requantized main audio stream at the high oversampling frequency and a digital to analog converter for generating a main analog output from the requantized main audio stream; and
a second processing path for driving the subwoofer including a lowpass crossover filter outputting a requantized bass audio stream at the high oversampling frequency and a digital to analog converter for generating a bass analog output from the requantized audio stream.

22. The audio system of claim 21, wherein the second processing path includes a summer for summing left and right channel input streams at an input of the lowpass crossover filter.

23. The audio system of claim 21, wherein the first processing path further includes a lowpass filter for removing out-of-band noise from the requantized main audio stream.

24. The audio system of claim 21, wherein the high oversampling rate is at least sixty-four times an audio sampling rate.

25. The audio system of claim 21 wherein the requantized main and bass audio streams have a quantization in a range of two to twelve bits.

* * * * *